Figure 1:
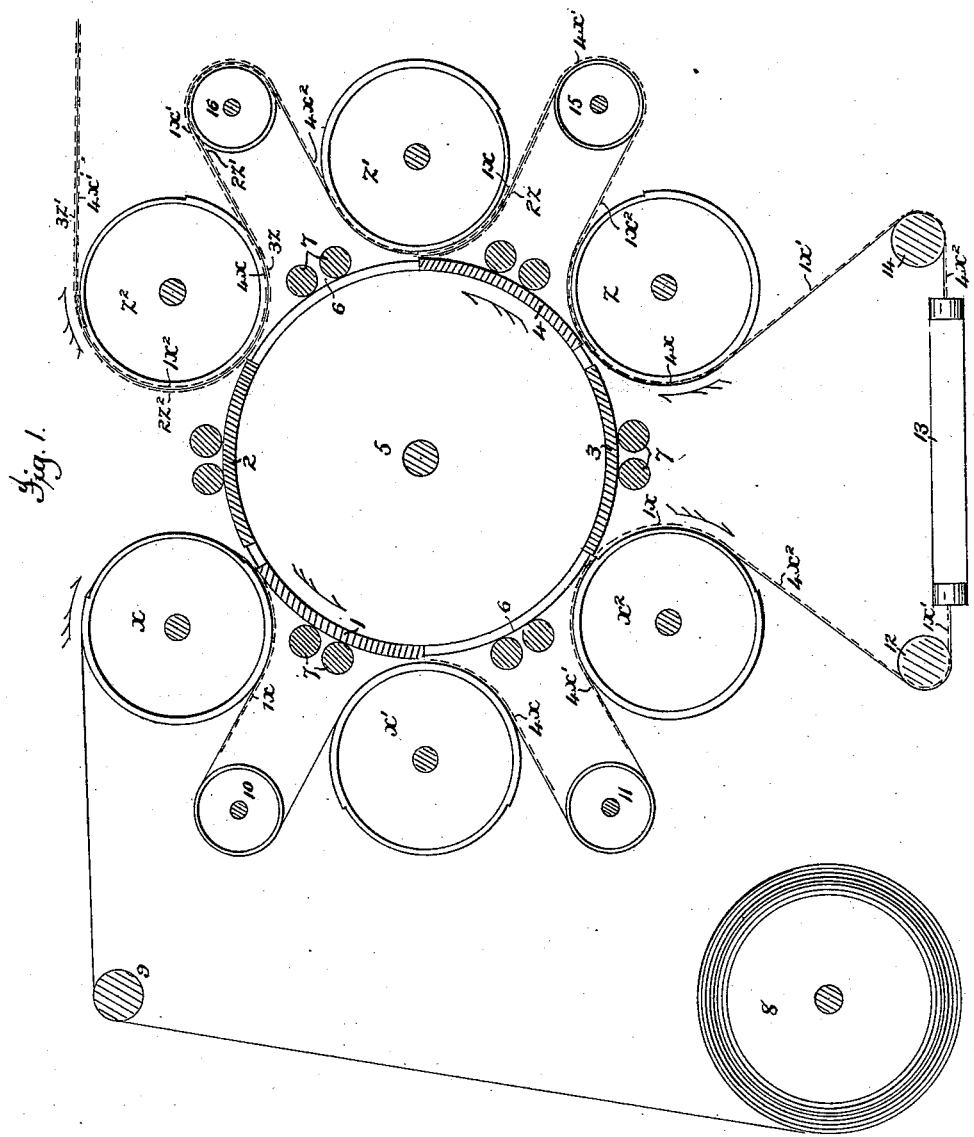

(No Model.)  3 Sheets—Sheet 1.

L. C. CROWELL.
WEB PRINTING MACHINE.

No. 298,182. Patented May 6, 1884.

Attest:
Geo. H. Graham
A. N. Jasbera

Inventor,
Luther C. Crowell,
by Munson & Philipp
Att'ys.

(No Model.)

L. C. CROWELL.
WEB PRINTING MACHINE.

No. 298,182. Patented May 6, 1884.

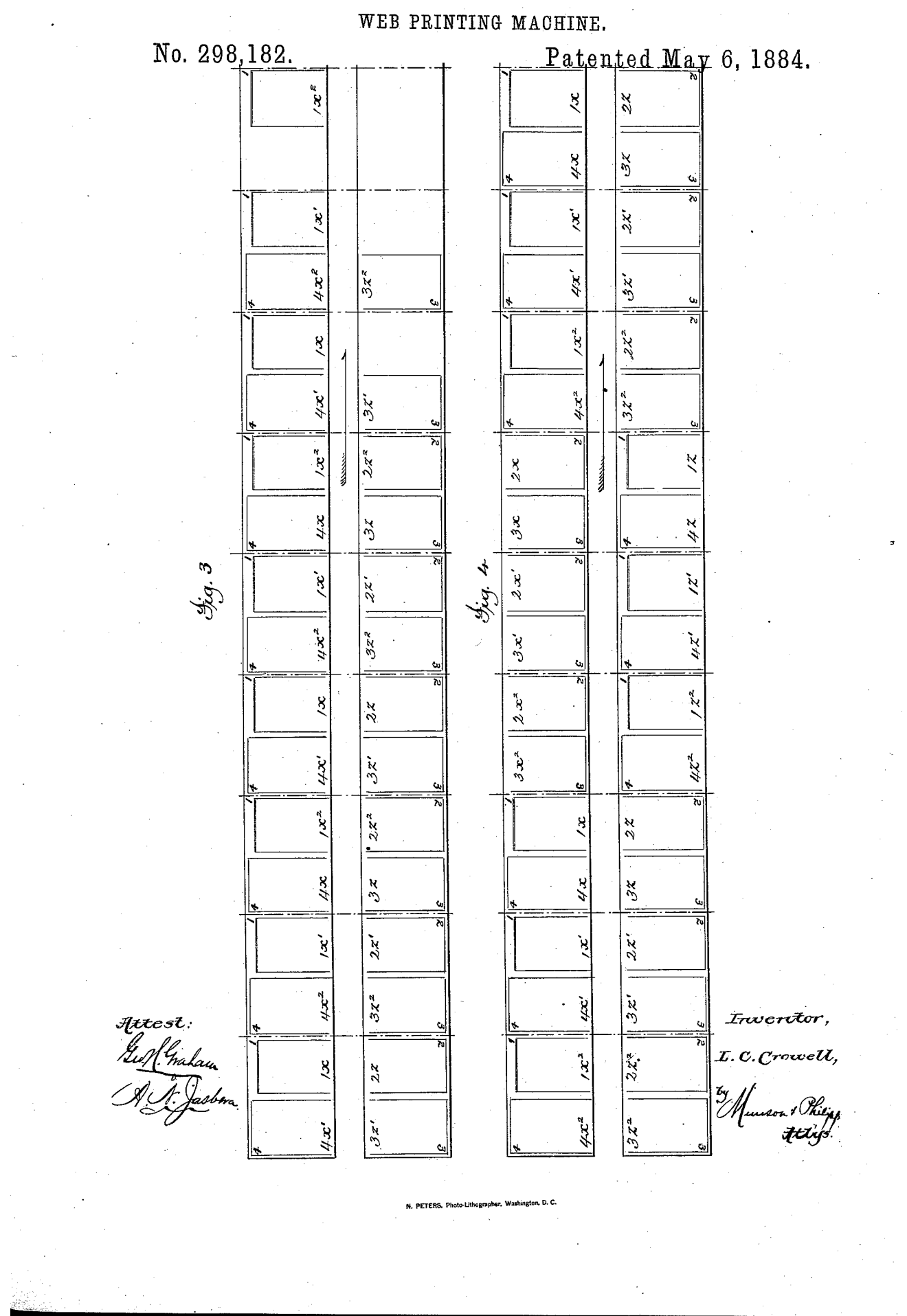

(No Model.)    3 Sheets—Sheet 3.

L. C. CROWELL.
WEB PRINTING MACHINE.

No. 298,182. Patented May 6, 1884.

Fig. 3

Fig. 4

Attest:
Geo. H. Graham
A. N. Jasbon

Inventor,
L. C. Crowell,
by Munson & Philipp
Attys.

UNITED STATES PATENT OFFICE.

LUTHER C. CROWELL, OF BROOKLYN, ASSIGNOR TO R. HOE & CO., OF NEW YORK, N. Y.

WEB-PRINTING MACHINE.

SPECIFICATION forming part of Letters Patent No. 298,182, dated May 6, 1884.

Application filed December 2, 1882. (No model.)

*To all whom it may concern:*

Be it known that I, LUTHER C. CROWELL, a citizen of the United States, residing in the city of Brooklyn, county of Kings, and State of New York, have invented certain new and useful Improvements in Web-Printing Machines, fully described and represented in the following specification and the accompanying drawings, forming a part of the same.

In order to produce newspapers at the speed required by most of the large establishments of the present day, it is necessary to use rotary mechanism and to print upon the paper while in the web; and it is also often desirable for various reasons, but particularly to save the delay and expense incident to stereotyping, to print directly from the type instead of from stereotype-plates. When the printing is done directly from the type, it is necessary to make the type or form cylinder of a comparatively large size, as in practice it is found impossible to successfully secure ordinary parallel type onto a cylinder as small as those commonly employed in web-printing machines which print from stereotype-plates. In order to secure economy and compactness in the structure of machines of this class, it has been found desirable to use but a single type-cylinder, around the circumference of which were arranged, in succession, the forms for printing both sides of the sheet, and to provide the same with a plurality of impression-cylinders, so that by turning the web and representing it to the type-cylinder, both of its sides may be successively printed from the same forms. When a cylinder of sufficient size to successfully carry the forms in type is used, it will be found so large that the forms for printing both sides of an ordinary folio or four-page paper will occupy very much less than its whole circumference. This fact makes it necessary, in order that the web may have a continuous and uniform feed, to provide the form-cylinder with register-rolls, and an increased number of impression-cylinders, so that the forms will be enabled to make two or more impressions upon each side of the web at each revolution of the form-cylinder.

In machines of this class, as heretofore constructed, the parts were so constructed and arranged that all of the forms acted upon each impression-cylinder, so that both sides of the web contained the same printed pages of matter, but arranged in such order that the inside pages of the sheet upon one side of the web would fall opposite the outside pages of the sheet upon the other, and vice versa. This was objectionable in that the alternate sheets, or series of sheets, passed to the delivery apparatus with their heads in opposite directions, (it being necessary in this class of machines to place the forms upon the cylinder in such position that the columns of matter lie parallel to its axis,) which made it necessary, if the sheets were folded, to provide two mechanisms for that purpose which would operate to fold the alternate sheets or series in opposite directions; or if they were to be flown, to provide two flies.

It is the object of the present invention to obviate this difficulty and to produce a mechanism in which the printing may be done directly from the type, in which the forms for printing both sides of the web shall be arranged circumferentially of a single cylinder, and by which different matter will be printed upon the opposite sides of the web—that is to say, by which only the outside pages of the sheet shall be printed upon one side of the web, and only the inside pages of the sheet upon the other side of the web.

To this end the invention consists, principally, in certain features of construction, by which the impression-cylinders are prevented from coming into printing-contact with one-half of the forms upon the form-cylinder, so that only one-half of the forms print upon each side of the web, thereby making the printed matter upon the opposite sides of the web entirely different.

The invention also embraces various other details of construction, and various combinations of parts in the printing mechanism, all of which will be hereinafter fully explained and particularly pointed out.

Figure 2:
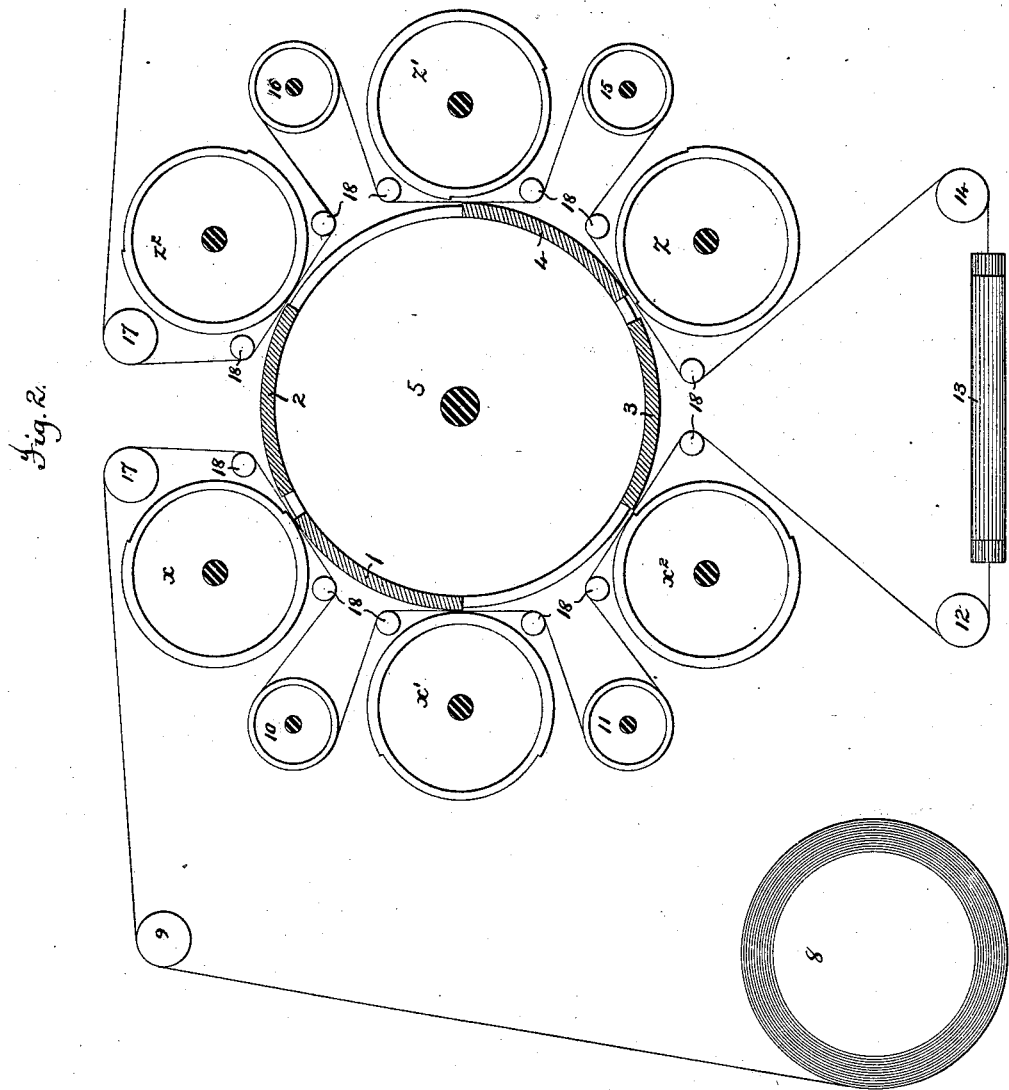

In the accompanying drawings, Figure 1 is a diagrammatic sectional view, illustrating one embodiment of the invention. Fig. 2 is a like view showing a slightly different construction. Fig. 3 is a diagram showing the order in which the impressions of the different forms occur upon the opposite sides of the web when the same is perfected by a mechanism embodying the present invention; and Fig. 4 is a diagram showing the order in which the impressions of the different forms occur upon the opposite sides of the web when the same is perfected by a mechanism of this class as heretofore constructed.

The mechanism in which the invention is shown as embodied is in most particulars of a common and well-known construction, and will not therefore require detailed description. It consists, essentially, of a type or form cylinder, 5, which is of sufficient size to permit forms of ordinary type to be securely fastened to its periphery, and is mounted to rotate in bearings supported in a suitable frame. This cylinder is provided with the usual devices for holding the forms, and is shown in the present case as carrying four forms of type, 1 2 3 4, for printing, respectively, pages, 1, 2, 3, and 4 of an ordinary folio or four-page newspaper. These forms together occupy two-thirds of the circumference of the cylinder, the forms for each side of the web occupying one-third, and are for convenience arranged in two groups occupying positions diametrically opposite each other upon the cylinder. The number of forms is of course immaterial, and they may be arranged in different order and position; but that shown is preferable.

The spaces between the groups of forms are occupied by ink-distributing tables or surfaces 6, to which the ink is supplied from a fountain, not shown, and from which it is taken and supplied to the forms by an ordinary inking mechanism, represented by the rolls 7.

Inasmuch as the forms for printing each side of the web occupy but one-third of the circumference of the form-cylinder, it becomes necessary, in order to print the whole surface of the web, that these forms should act three times at each revolution of the form-cylinder. This is accomplished by providing three impression-cylinders for each side of the web, which, together with certain register-rolls, are so arranged as to present the web three times to each form at each revolution of the form-cylinder. The web is led from a roll, as 8, and, after passing over a guide-roll, 9, passes around the first-impression cylinder, $x$, thence outward around a register-roll, 10, thence inward around the second-impression cylinder, $x'$, thence outward around a second register-roll, 11, and thence inward around the third-impression cylinder, $x^2$. In passing the cylinder $x$ the web will receive an impression, $1x$, from form 1, and the part bearing this impression will pass outward around register-roll 10, while the form will pass onward and give a second impression, $1x'$, to that portion of the web passing around cylinder $x'$, the part bearing this impression passing outward in like manner around register-roll 11, while the form passes forward to make a third impression, $1x^2$, upon that portion of the web passing around cylinder $x^2$. The register-rolls 10 11 are placed at such a distance from the form-cylinder that the space between the impression $1x$ and the impression $1x'$ will be just the width of one form, including its margins, and that the impression $1x^2$ will be a like distance in advance of the impression $1x'$.

It will be observed that the impression-cylinders $x$ $x'$ $x^2$ are of one-half the size of the form-cylinders, and consequently are in circumference equal to the width of three forms, including their margins. These cylinders, it will also be observed, have about one-third of their peripheries slightly cut away or depressed, and are so adjusted with relation to the form-cylinder that as they revolve these cut-away or depressed portions will fall opposite the forms 2 and 3, thus permitting these forms to pass without giving impressions to the web upon cylinders $x$ $x'$ $x^2$. Immediately after the form 1 has made the impression $1x^2$ upon the cylinder $x^2$ the form 4 will make an impression, $4x$, upon the cylinder $x$, between which impression and the impression $1x$ there will be a blank space just equal to the width of two forms, including their margins. This form will then make a second impression, $4x'$, upon the cylinder $x'$ just the width of one form in advance of the impression $4x$, and just in the rear of the impression $1x$, after which it will make a third impression, $4x^2$, upon the cylinder $x^2$ just the width of one form in advance of the impression $4x'$ and upon the space between impressions $1x$ and $1x'$. Upon the second revolution of the type-cylinder the form 1 will, as will readily be seen, make its impression $1x$ the width of two forms in the rear of the impression $4x$, its impression $1x'$ immediately in the rear of the impression $4x$, and its impression $1x^2$ upon the space between impressions $4x$ and $4x'$; and thus the operation will continue to be repeated, so that the web, as it leaves cylinder $x^2$, will be entirely printed upon its inside, the impressions occurring in the order stated and as clearly shown in the upper diagram of Fig. 3. After being thus printed upon one side, the web passes around a register-roll, 12, to a web-turner, 13, by which it is reversed, so as to present its imprinted side to the form-cylinder, after which it passes around a register-roll, 14, and to the second series of impression-cylinders $z$ $z'$ $z^2$ and register-rolls 15 16. The second series of impression-cylinders, like the first, have portions of their peripheries cut away or depressed, and are so adjusted that as the form-cylinder revolves the forms 1 4 will come opposite to said depressed portions and be permitted to pass without printing upon the web. In passing around the cylinders $z$ $z'$ $z^2$ the imprinted side of the web will receive impressions from the forms 2 3, which impressions will occur in the order already set forth in connection with forms 1 4, the register-rolls 12 14 being so adjusted that the impressions from form 2 will be opposite those from form 1, and those from form 3 opposite those from form 4, all as clearly shown in Fig. 3. From the foregoing it will be seen that as the web leaves cylinder $z^2$ it will be entirely printed upon both its sides, one side containing the outside pages of the sheet and the other the inside pages of the sheet, the heads of the columns of all the sheets lying at the same side of the web. The web can then be severed into sheets by any approved form of severing mechanism, and all of the sheets can be folded in the same direction by a single folding mechanism, or can be delivered to a single fly.

It has already been stated that in machines of this class, as heretofore constructed, each of the forms upon the form-cylinder operated against all of the impression-cylinders, so that both sides of the web contained the same printed matter. This result was due to the fact that the impression-cylinders in those cases were so constructed and operated that none of the forms could pass them without coming into contact with the web. To still further illustrate the advantages of the present construction, I have in Fig. 4 shown the order in which the impressions of the several forms would occur upon the opposite sides of a web perfected upon a mechanism like that herein shown, when each form is made to operate against all of the impression-cylinders, it being of course understood that when in such a construction three impression-cylinders are used for each side of the web the form-cylinder must be of such size that the forms will occupy but one-third of its circumference. It will thus be seen, by reference to Fig. 4, that when a web is perfected in this manner, the alternate series of three sheets will pass to the delivery apparatus with their columns headed in opposite directions and with different matter upon their upper surfaces. This, as will readily be seen, makes it impracticable to fold or fly all in the same direction, and makes two folders or flies working in the opposite directions necessary. In the structure shown in Fig. 2 the web, instead of lying against the surfaces of the impression-cylinders as it passes around them, is carried around leading-rolls, as 17 18, so as to be kept entirely clear of said cylinders, except just at their points of contact with the forms. This arrangement will be of advantage in some cases, as it insures a more even and uniform tension upon the web.

It is of course to be understood that the printing may be done from stereotype-plates instead of directly from the type, and that the forms for printing each side of the web, whether in type or stereotype, may occupy more or less than one-third of the form-cylinder, the number and sizes of the impression-cylinders and the extent of their cut-away or depressed portions being regulated accordingly.

The web-turner 13 may be of either of the forms shown in United States Letters Patent No. 212,444, or of any other approved construction, or the printing apparatus may be used without a web-turner, the perfecting of the web being accomplished by passing it a second time through the apparatus, as shown in Letters Patent No. 9,987.

It is also to be remarked that, instead of providing the impression-cylinders with depressed or cut-away portions, the forms upon the form-cylinder may be given a slight in and out movement to bring them into and out of printing contact with the proper cylinders.

What I claim is—

1. The combination, with a form-cylinder, of a plurality of impression-cylinders, and means for causing said impression-cylinders to come into printing contact with certain of the forms upon said form-cylinder, and to keep from printing contact with the remaining forms, whereby one side of a web may be printed from one set of forms upon said form-cylinder and avoid the remaining forms thereon, all substantially as described.

2. The combination, with a form-cylinder, of two sets of impression-cylinders and a web-turner, and means for causing each of said sets of impression-cylinders to come into printing contact with certain of the forms upon the form-cylinder and to keep out of printing contact with the remaining forms, all substantially as described.

3. The combination, with a form-cylinder, of a plurality of impression-cylinders and a register roll or rolls, said impression-cylinders having portions of their peripheries depressed or cut away, substantially as described.

4. The combination, with a form-cylinder, of two sets of impression-cylinders and register-rolls, said impression-cylinders having portions of their peripheries depressed or cut away, and a web-turner, substantially as described.

5. The combination, with a form-cylinder, of a plurality of impression-cylinders and a register roll or rolls, said impression-cylinders having portions of their peripheries depressed or cut away, and a series of leading-rolls, as 18, substantially as described.

In testimony whereof I have hereunto set my hand in the presence of two subscribing witnesses.

LUTHER C. CROWELL.

Witnesses:
JAS. A. HOVEY,
T. H. PALMER.